United States Patent
Arakawa

[11] Patent Number: 5,417,400
[45] Date of Patent: May 23, 1995

[54] WIRE HOLDER

[75] Inventor: Hideo Arakawa, Tokyo, Japan

[73] Assignee: Arakawa & Co., Ltd., Tokyo, Japan

[21] Appl. No.: 793,822

[22] Filed: Nov. 18, 1991

[30] Foreign Application Priority Data

Nov. 21, 1990 [JP] Japan .................. 2-122274 U
Mar. 20, 1991 [JP] Japan .................. 3-024339 U
Jul. 2, 1991 [JP] Japan .................. 3-19665

[51] Int. Cl.[6] ............................................. F16G 11/00
[52] U.S. Cl. ............................... 248/323; 24/136 A; 24/706.8; 248/328
[58] Field of Search ............... 248/231.3, 291, 59, 248/321, 323, 327, 324, 316.3; 24/136 A, 706.8

[56] References Cited
U.S. PATENT DOCUMENTS

| | | | |
|---|---|---|---|
| 1,391,611 | 9/1921 | Butler | 248/343 |
| 1,606,873 | 11/1926 | Gamache et al. | 24/136 A |
| 3,072,989 | 1/1963 | Jugle et al. | |
| 4,141,117 | 2/1979 | Van Gompel | 24/136 A X |
| 4,278,224 | 7/1981 | Arakawa | 248/246 |
| 4,656,698 | 4/1987 | Arakawa | 24/136 A |
| 5,058,847 | 10/1991 | Arakawa | 248/328 |
| 5,147,145 | 9/1992 | Facey et al. | 24/136 A X |

FOREIGN PATENT DOCUMENTS

| | | |
|---|---|---|
| 0296537 | 12/1988 | European Pat. Off. . |
| 8520830 | 9/1985 | Germany . |
| 8716482 | 7/1987 | Germany . |
| 9001745 | 4/1990 | Germany . |
| 1782 | of 1912 | United Kingdom .......... 24/136 A |

OTHER PUBLICATIONS

EPO Search Report, 91119597.2, Mar. 3, 1992, European Patent Office.

Primary Examiner—Alvin C. Chin-Shue
Assistant Examiner—Derek J. Berger
Attorney, Agent, or Firm—Price, Gess & Ubell

[57] ABSTRACT

A wire holder capable of facilitating adjustment and/or variation of a length and tension of the wire. The wire holder includes a wire grip and a connector. The connector is formed on an outer surface thereof with a groove longitudinally extending from an upper end portion thereof to an intermediate portion thereof and laterally extending from a substantially central portion of the connector to the outer surface of the connector in the manner that a bottom surface of the groove is smoothly curved so as to gradually decrease a depth of the groove toward a lower end portion of the connector and toward the outer surface of the connector.

14 Claims, 8 Drawing Sheets

FIG.2
FIG.4
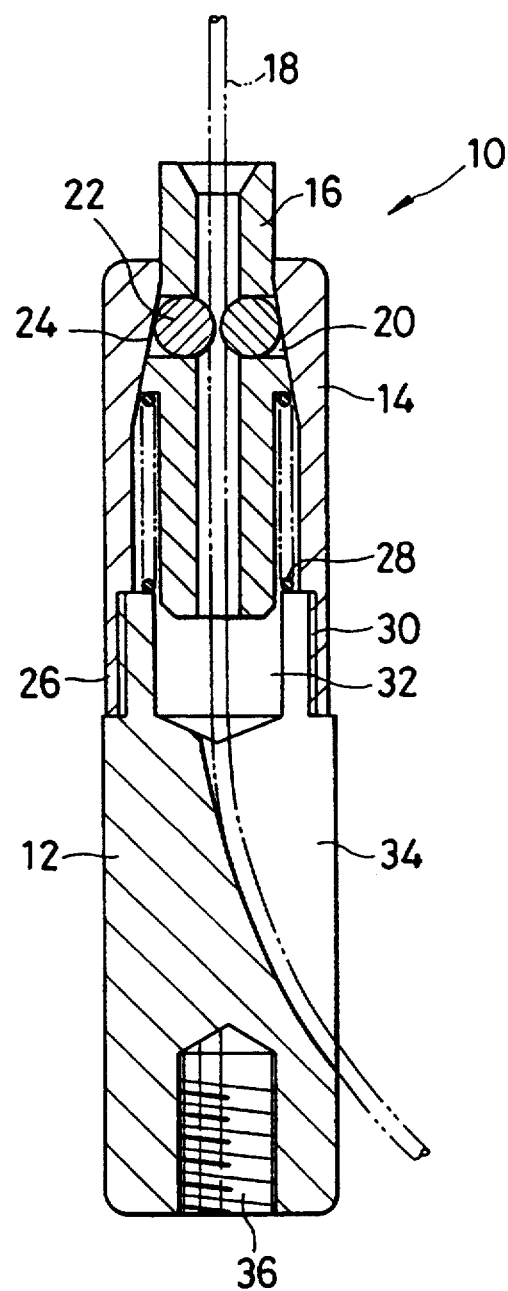
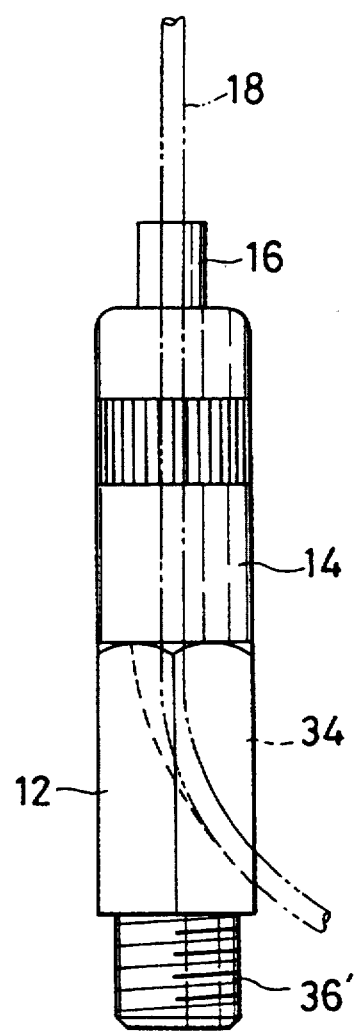

WIRE HOLDER

BACKGROUND OF THE INVENTION

This invention relates to a wire holder, and more particularly to a wire holder adapted to stretchedly hold a wire to carry out suspension of an article such as an illuminator, a shelf, a hanger, a panel or the like from a ceiling or the like through the wire, setting-up of an article such as a pillar or the like through the wire, or the like.

DESCRIPTION OF RELATED ART

A conventional wire holder is classified into various groups such as a wire suspending holder which is adapted to suspend an illuminator or the like from a ceiling or the like through a wire, a wire stretching holder which is adapted to set up a pillar or the like through a wire, and the like.

The wire suspending holder generally includes a wire grip which comprises a hollow holder formed therein with a tapered region and a sleeve having balls or shoes held therein and formed with a through-hole through which a wire is inserted. The sleeve is received in the holder in a manner to be slidable therein. The wire suspending holder further includes a Spring member for forcing the sleeve to press the balls against the tapered region of the holder. Suspending of an illuminator through a wire from a ceiling by means of the conventional wire suspending holder thus constructed is carried out in such a manner that the wire is inserted through the sleeve to grip the wire by means of the wire grip. Then, the wire is fixed at one end thereof on the ceiling and the wire suspending holder on the side of the other end of the wire is connected to a casing of the illuminator by threadedly engaging a mounting screw fittedly mounted in a mounting hole formed at the casing of the illuminator with a lower end of the wire suspending holder.

Unfortunately, in the suspension of the illuminator by means of the conventional wire suspending holder constructed as described above, the wire must be inserted throughout both wire suspending holder and mounting screw. Therefore, when a vertical position of the illuminator is to be adjusted, the lower end of the wire is often caused to enter the illuminator, resulting in a possibility of causing troubles due to short-circuiting.

The conventional wire stretching holder which is adapted to set up a pillar or the like through a wire is disclosed in Japanese Utility Model Application No. 17909/1989 (1-17909) and generally constructed in such a manner as shown in FIG. 1. More particularly, the wire stretching holder includes a ball-type wire grip 100 including a casing 102 and a threaded connector 104 including a connector body 106 threadedly fitted at a distal end thereof in a proximal portion of the casing 102 and a hollow support member 108 of which a distal end is threadedly fitted on the connector body 106. The support member 108 is formed at a proximal end thereof with a guide cutout 110 so as to extend by an angle of 90 degrees. The connector 104 also includes a pivotable member 112 pivotally connected to the support member 108 so as to be pivotally movable by an angle of 90 degrees through the guide cutout 110. More particularly, the pivotable member 112 comprises a joint section 114 which includes a hemispherical rolling element 116 received in the support member 108 of the connector 104 and a threaded rod element 118 extending from the rolling element 116 and a threaded holding section 120 which is formed at a distal end thereof with a threaded hole 122. The rod element 118 of the joint section 114 is threadedly inserted into a proximal end of the holding section 120 through a sleeve element 122, so that the pivotable member 112 may be pivotally moved over an angle of about 90 degrees through the guide cutout 110.

The conventional wire stretching holder constructed as described above facilitates fixing of the wire and permits a direction of stretching of the wire to be readily varied. However, the wire stretching holder is disadvantageous in that when a length of the wire stretched is to be adjusted, a free end of the wire is abutted against the connector, to thereby prevent smooth movement of the threaded holding section 120, so that it is required to cut the wire.

SUMMARY OF THE INVENTION

The present invention has been made in view of the foregoing disadvantage of the prior art.

Accordingly, it is an object of the present invention to provide a wire holder which is capable of safely and readily accomplishing the insertion and adjustment of a wire therethrough.

It is another object of the present invention to provide a wire holder which is capable of facilitating adjustment and/or variation of a length of the wire without any electrical danger.

It is a further object of the present invention to provide a wire holder which is capable of facilitating adjustment and/or variation of a length of the wire with a simple operation.

It is still another object of the present invention to provide a wire holder which is capable of accomplishing the above-described objects with a simple structure.

In accordance with the present invention, a wire holder is provided. The wire holder comprises a wire grip and a connector connected at one end portion thereof to the wire grip and at the other end thereof to a supported article. The wire grip comprises a sleeve formed so as to permit a wire to be inserted therethrough, a ball means arranged for selectively restricting the wire, a casing arranged for receiving the sleeve and ball means therein and formed therein with a tapered region and a spring for forcing the sleeve to press the ball means against the tapered region. The connector is formed on an outer surface thereof with a groove communicating with the sleeve of the wire grip and longitudinally extending from one end portion thereof to an intermediate portion thereof in such a manner that a bottom surface of the groove is curved so as to decrease a depth of the groove toward the other end portion of the connector and toward the outer surface of the connector.

In a preferred embodiment of the present invention, the groove is formed so as to laterally extend from a substantially central portion of the connector to the outer surface of the connector.

In a preferred embodiment of the present invention, the groove is formed so as to be smoothly curved so that the depth of the groove is gradually decreased.

In a preferred embodiment of the present invention, the connector is provided at both end portions thereof with threads and threadedly connected to the wire grip. The threads provided at one end portion of the connector through which the connector is connected to the wire grip may comprise male threads. The threads provided at the other end portion of the connector may comprise female threads. Alternatively, the threads provided at the other end portion of the connector may comprise male threads.

In a preferred embodiment of the present invention, the connector may be provided at the other end portion thereof with a threaded connecting member in a manner to be pivotally movable over an angular range of about 90 degrees, wherein the supported article is connected through the threaded connecting member to the connector. The threaded connecting member may be arranged so as to rollable with respect to the connector. The connector may comprise a connector body connected to the wire grip and a support section connected to the connector body for movably supporting the threaded connecting member.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 2 is a vertical sectional view showing an embodiment of a wire holder according to the present invention;

FIG. 4 is a front elevation view showing a modification of the wire holder shown in FIG. 2;

DETAILED DESCRIPTION OF THE PREFERRED EMBODIMENTS

Figure 1:
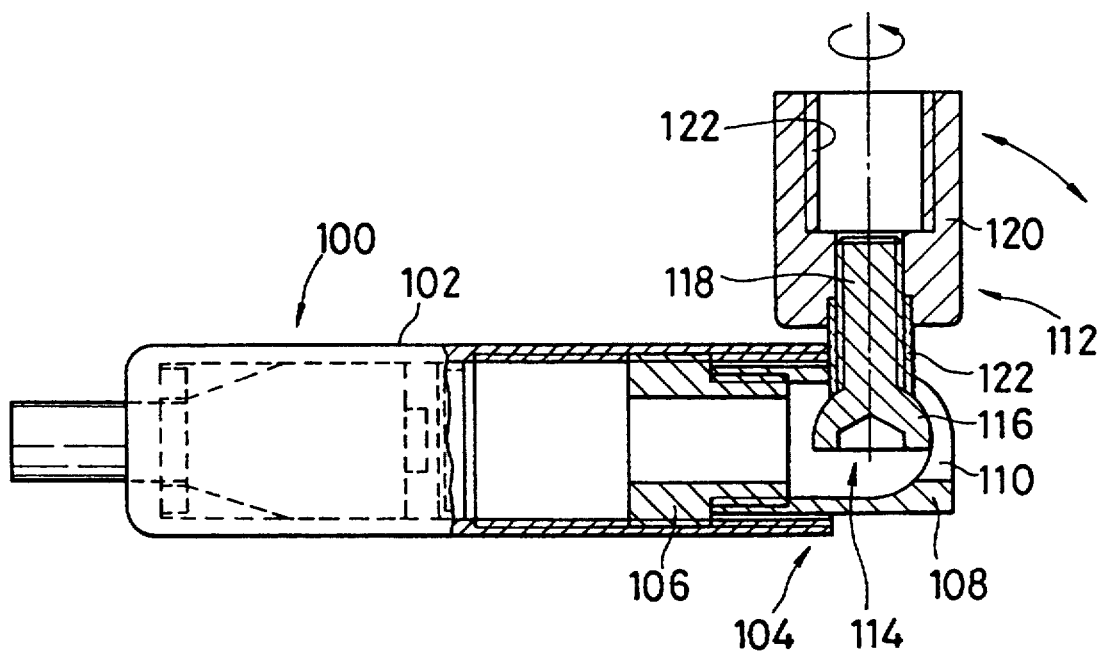
FIG. 1 is a front elevation view partly in section showing a conventional wire holder.

Now, a wire holder according to the present invention will be described hereinafter with reference to FIGS. 2 to 9, in which like reference numerals designate like or corresponding parts throughout.

FIG. 2 shows an embodiment of a wire holder according to the present invention, which is embodied in the form of a wire suspending holder. A wire holder of the illustrated embodiment generally includes a wire grip 10 and a connector 12. The wire grip 10 includes a casing 14 formed into a hollow cylindrical shape and open at both ends thereof and a hollow cylindrical sleeve 16 open at both ends thereof so as to permit a wire 18 to be inserted therethrough and received in the casing 14. The sleeve 16 is formed at a substantially central portion thereof with a tapered region of a frustconical shape in section of which an outer surface is tapered toward a distal end or upper end thereof. The tapered region is formed with through-hole 20 extending in a diametric direction of the sleeve or in a direction perpendicular to an axial direction of the sleeve 16, in which balls 22 are received in a manner to be opposite to each other, resulting in restriction and release of the wire being selectively carried out. For this purpose, the casing 14 is formed on an inner surface thereof with a tapered region 24 of which an inner surface is tapered toward a distal end or upper end thereof in a manner to correspond in position and shape to the tapered region of the sleeve 16. The casing 14 is provided at a proximal end thereof with threads 26. In the illustrated embodiment, the threads 26 are female or internal. Also, in the casing 14 is arranged a coiled spring 28 for resiliently forcing the tapered region of the sleeve 16 in a direction of the distal end of the sleeve 16, so that the balls 22 are normally pressed against the tapered region 24 of the casing 14.

The connector 12 is formed into a pillar-like shape. In the illustrated embodiment, it may be formed into a shape like a hexagonal pillar for multifaceted planar surfaces. The connector 12 is provided at a distal end or upper end portion thereof with threads 30, which are engaged with the threads 26 of the casing 14 to connect the connector 12 to the wire grip 10. Thus, in the illustrated embodiment, the threads 30 are male or external. The connector 12 is provided at a central portion of the distal end thereof with a recess 32 extending into the solid body of the central portion and acting as a relief for the sleeve 16 slid in the casing 14.

The connector 12 is formed on an outer surface thereof with a groove 34 communicating with the sleeve 16 of the wire grip 10 and longitudinally extending from one end portion thereof to an intermediate portion thereof in such a manner that a bottom surface of the groove 34 is curved so as to decrease a depth of the groove toward the other end portion of the connector and toward the outer surface of the connector. The groove 34 may be formed so as to laterally extend from a central axis of the connector 12 to the outer surface of the connector. More particularly, in the illustrated embodiment, the groove 34 is formed so as to longitudinally extend from the upper end portion of the connector 12 or the recess 32 to the intermediate portion of the connector 12 and laterally extending from a substantially central portion of the connector 12 to the outer surface of the connector in such a manner that the bottom surface of the groove 34 is smoothly curved so as to gradually decrease the depth of the groove toward a proximal or lower end portion of the connector 12 and toward the outer surface of the connector. Also, the connector 12 is provided at the proximal end thereof with threads 36 for connecting a suspended article such as an illuminator or the like to the connector, which, in the illustrated embodiment, comprise female threads.

The connector 12 thus constructed is fixedly connected to the wire grip 10 by securely engaging the external threads 30 at the distal end of the connector 12 with the internal threads 26 at the proximal end of the casing 14. In the illustrated embodiment, the spring 28 is arranged between the tapered region of the sleeve 16 and the distal end of the connector 12, so that the connector functions also as a spring retainer. However, it is a matter of course that a spring retainer independent from the connector 12 may be provided in the casing 14.

Figure 3:
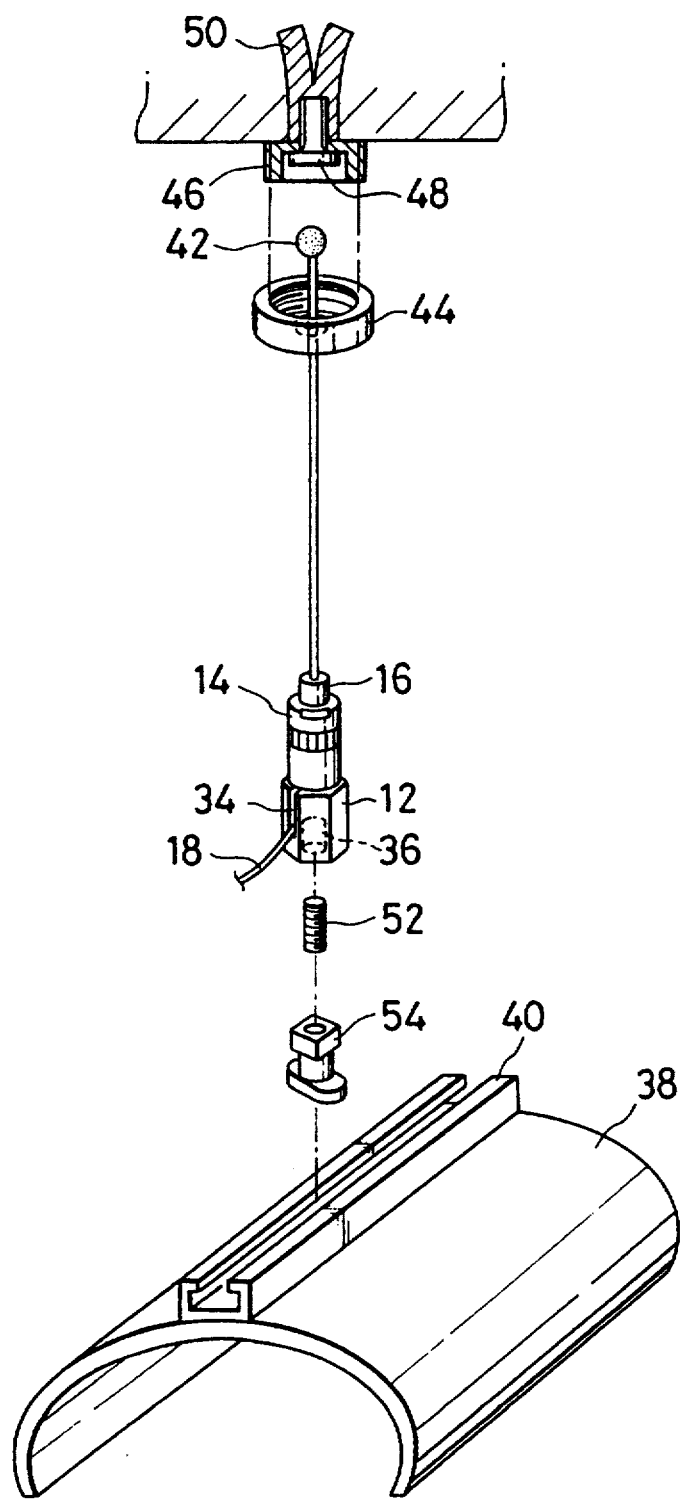
FIG. 3 is a perspective view showing the manner of operation of the wire holder shown in FIG. 2.

Now, the manner of operation of the wire holder of the illustrated embodiment constructed as described above will be described hereinafter with reference to FIGS. 2 and 3. FIG. 3 shows an example that the wire holder of the illustrated embodiment is applied to suspension of an illuminator including a housing 38 and a rail 40 mounted on the housing 38, wherein suspending of the illuminator from a ceiling is carried out by mounting a holding ball 42 provided at a distal end of a wire 18 on the ceiling by means of a cap nut 44, a washer 46, a mounting bolt 48 and an anchor bolt 50.

First, a stud bolt 52 is threaded into the internal threads 36 of the connector 12 and a fixing nut 54 provided with a flange is fitted in the rail 40. Then, the fixing nut 54 is securely engaged with the stud bolt 52, resulting in the housing 38 of the illuminator being connected to the wire holder.

Then, the wire 18 is inserted at a distal or free end thereof through the sleeve 16 while pressing the sleeve 16 against the coiled spring 28 to position the illuminator at a desired height. Then, the sleeve is rendered free, to thereby cause the wire grip 10 to grasp the wire 18. This results in the illuminator being held at a desired height while being suspended from the ceiling. In the illuminator suspending operation, the free end of wire 18 is guided along the curved groove 34 of the connector 12 while being abutted against the bottom surface of the curved groove 34, resulting in being laterally outward led out from the connector and therefore the wire holder. Thus, it will be noted that the wire holder of the illustrated embodiment effectively prevents the wire from entering the illuminator.

Figure 5:
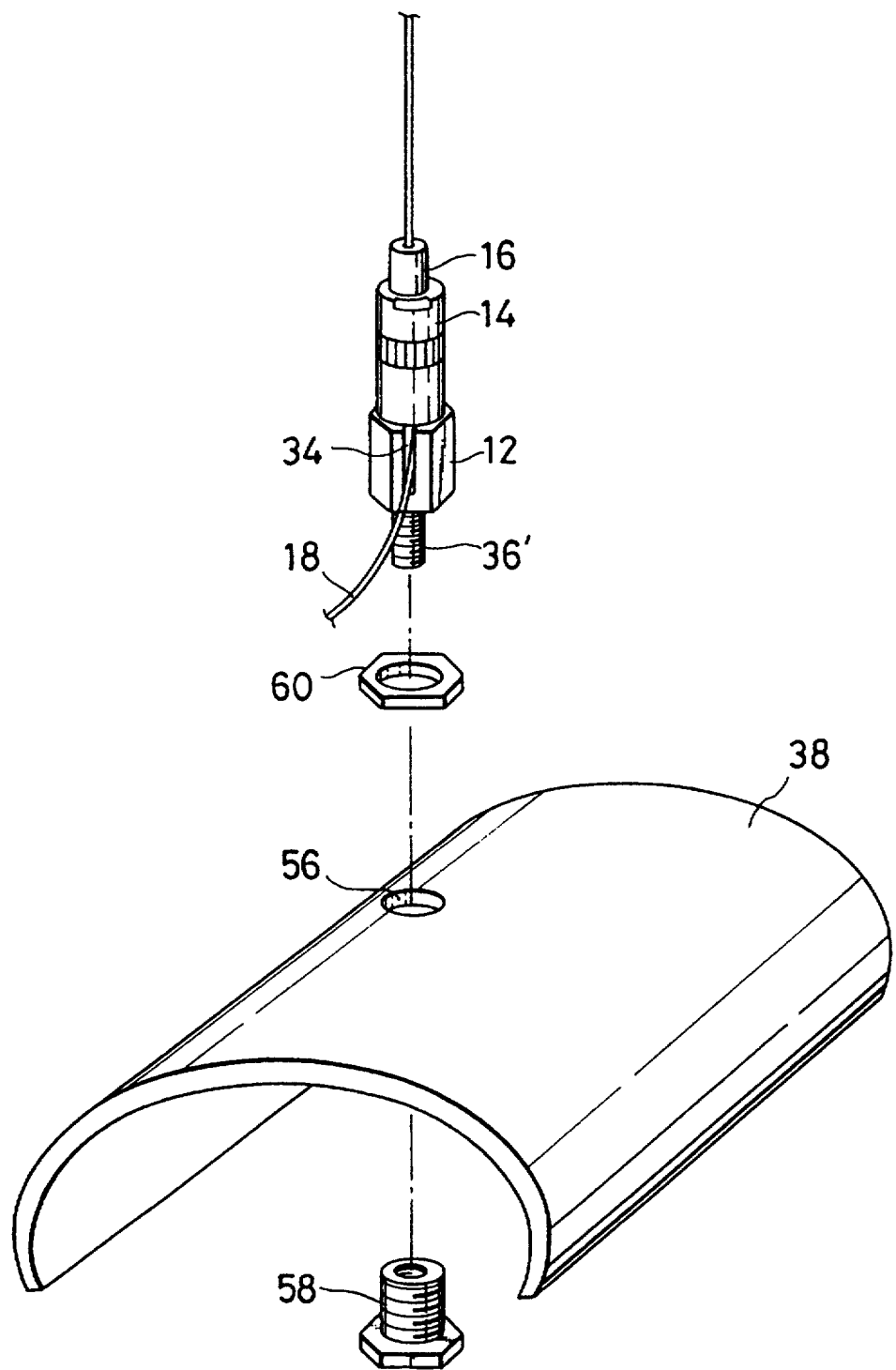
FIG. 5 is a perspective view showing the manner of operation of the wire holder shown in FIG. 4.

FIG. 4 shows a modification of the wire holder shown in FIG. 2. In the modification, threads 36' provided at a proximal end of a connector 12 comprise male threads. The remaining part of the modification may be constructed in substantially the same manner as the embodiment of FIG. 2. The wire holder of the modification thus constructed may be used in such a manner as shown in FIG. 5. A housing 38 of an illuminator is provided at a top thereof with an aperture 56, through which a screw 58 having threads formed on both inner and outer surfaces thereof and including a head is inserted. Then, a nut 60 is threadedly fitted on the screw 58 and the male threads 36' of the connector 12 are threadedly fitted in the screw 58. Subsequently, the nut 60 is tightened to fix the housing 38 to the screw 58 and a wire 18 is gripped by a wire grip 10 of the wire holder, so that the housing 38 may be safely suspended from a ceiling.

The wire holder of the illustrated embodiment, as described above, is so constructed that the connector is formed on the outer surface thereof with the groove longitudinally extending from the upper end portion thereof to the intermediate portion thereof and laterally extending from the substantially central portion of the connector to the outer surface of the connector in the manner that the bottom surface of the groove is curved so as to decrease a depth of the groove toward the lower end portion of the connector and toward the outer surface of the connector. Such construction of the illustrated embodiment permits the free end of the wire to be led out to the exterior of the connector while being deflected from the central axis of the connector along the curved groove during the operation of suspending an illuminator from a ceiling. Thus, the wire holder of the illustrated embodiment effectively prevents the wire from entering the illuminator, to thereby eliminate problems due to short-circuiting.

Figure 6:
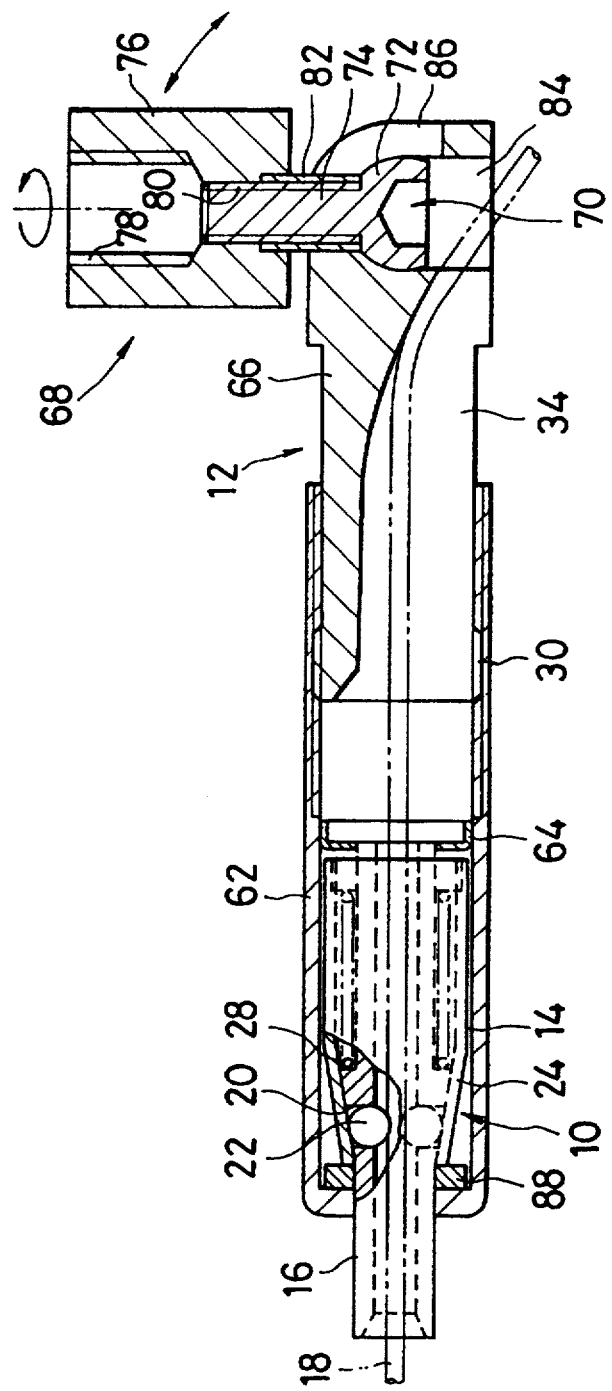
FIG. 6 is a vertical sectional view showing another embodiment of a wire holder according to the present invention.
Figure 7:
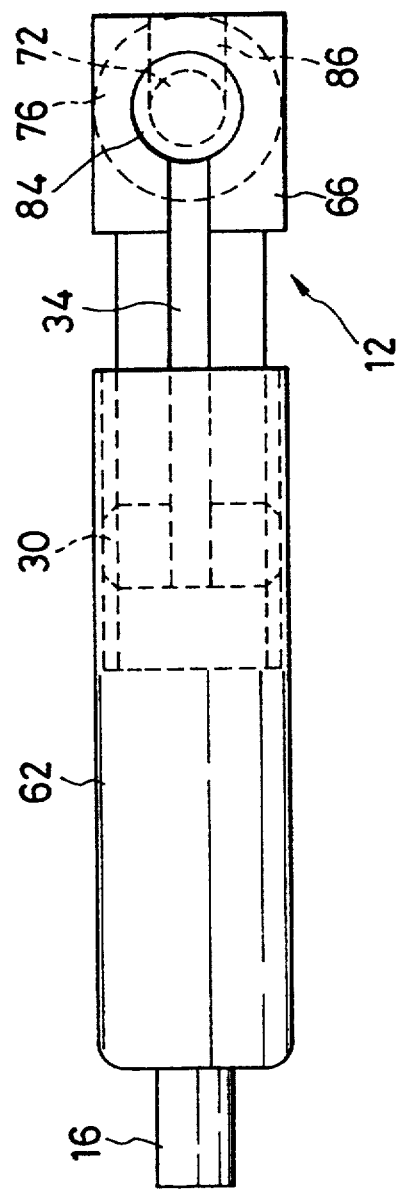
FIG. 7 is a bottom view of the wire holder shown in FIG. 6.

Referring now to FIGS. 6 and 7 showing another embodiment of a wire holder according to the present invention, a wire holder of the illustrated embodiment is embodied in the form of a wire stretching holder. More particularly, the wire holder likewise generally includes a ball-type wire grip 10 and a connector 12. The ball-type wire grip 10 includes an inner casing 14 formed into a hollow cylindrical shape and open at both ends thereof and a hollow cylindrical sleeve 16 open at both ends thereof so as to permit a wire 18 to be inserted therethrough and received in the inner casing 14. The sleeve 16 is formed at a substantially central portion thereof with a tapered region of a frust-conical shape in section of which an outer surface is tapered toward a distal end thereof. The tapered region is formed with a through-hole 20 extending in a direction perpendicular to an axial direction of the sleeve 16, in which balls 22 are received in a manner to be opposite to each other, resulting in movement of the wire being controlled. For this purpose, the inner casing 14 is formed on an inner surface thereof with a tapered region 24 which is tapered toward a distal end thereof in a manner to correspond in position and shape to the tapered region of the sleeve 16. Also, in the inner casing 14 is arranged a spring 28 in the form of a coiled spring for resiliently forcing the tapered region of the sleeve 16 in a direction of the distal end of the sleeve 16, so that the balls 22 are normally pressed against the tapered region 24 of the casing 14. The inner casing 14 and sleeve 16 thus constructed are received in an outer casing 62 to form the wire grip 10. The inner casing 14 is secured in the outer casing 62 by means of a bottom lid 64 of an annular shape.

The connector 12 includes a connector body 66 which is formed into a pillar-like shape and provided at a distal end portion thereof with threads 30, through which the connector body 66 is threadedly inserted at the distal end thereof into a proximal end of the outer casing 62. The connector body 66 is formed on an outer surface thereof with a groove 34 communicating with the sleeve 16 of the wire grip 10 and longitudinally extending from one end or distal end portion thereof to an intermediate portion thereof in such a manner that a bottom surface of the groove 34 is curved so as to decrease a depth of the groove toward the other end portion of the connector body 66 and toward the outer surface of the connector body. The groove 34 may be formed so as to laterally extend from a substantially central portion of the connector body 66 to the outer surface of the connector body. More particularly, in the illustrated embodiment, the groove 34 is formed so as to longitudinally extend from the distal end portion of the connector body 66 to the intermediate portion of the connector body 66 and laterally extending from the substantially central portion of the connector body 66 to the outer surface of the connector body in such a manner that the bottom surface of the groove 34 is smoothly curved so as to gradually decrease the depth of the groove toward the proximal end portion of the connector body 66 and toward the outer surface of the connector body.

Also, the connector 12 includes a threaded connecting member 68 which is mounted on the connector body 66 so as to be pivotally movable and rollable with respect to the connector body. The threaded connecting member 68 comprises a joint section 70 which includes a hemispherical rolling element 72 and a threaded rod element 74 extending from the rolling element 72 and a threaded holding section 76 which is formed into a substantially hollow cylindrical shape and at both distal and proximal ends thereof with threads 78 and 80, respectively. The rod element 74 of the joint section 70 is threadedly inserted through a sleeve element 82 into the threads 80 formed at the proximal end of the holding section 76. To the threads 78 at the distal end of the holding section 76 is threadedly connected to a supported article or set-up pillar (not shown).

Correspondingly, the connector body 66 is formed at a proximal end portion thereof with a joint receiving recess 84 for rollably receiving the hemispherical rolling element 74 and a guide cutout 86 communicating with the joint receiving recess 84. The guide cutout 86 is arranged so as to permit the rod element 74 of the joint section 70 to outward extend therethrough and be pivotally movable within an angular range of about 90 degrees depending upon the rolling of the rolling element 72 in the receiving recess 84. In FIG. 6, reference numeral 88 designates an elastic ring member arranged so as to prevent the inner casing 14 from slipping. In the illustrated embodiment, at the distal end of the threaded holding section 76 are provided the threads 78, however, a threaded rod (not shown) may be substituted for the threads 78.

The remaining part of the illustrated embodiment may be constructed in substantially the same manner as the above-described embodiment.

Now, the manner of stretching a wire by means of the wire holder of FIGS. 6 and 7 constructed as described above will be described hereinafter with reference to FIG. 6.

First, the threaded holding section 76 is fixedly mounted on a mounting means such as a mounting board or the like through the threads 78 or threaded rod and then the wire 18 is inserted through the sleeve 16 of the ball-type wire grip 10 to a required degree while pressing the sleeve 16 against the spring 28. Then, the sleeve 16 is rendered free, so that the wire 18 is gripped by the wire grip 10, resulting in being adjusted to desired length and tension. During the wire stretching operation, the wire 18 is guided along the curved groove 34 of the connector 12 while being abutted against the curved bottom surface of the curved groove 34, resulting in being laterally outward led out from the connector body 66. Thus, it will be noted that the wire holder of the illustrated embodiment facilitates the wire stretching operation and the adjustment of length of the wire.

Figure 8:
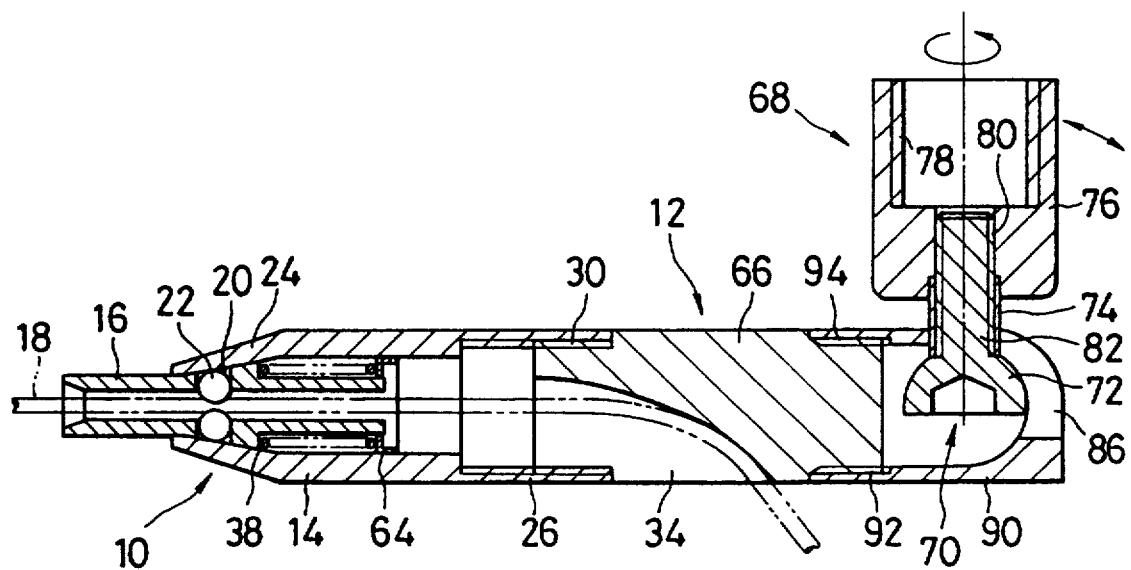
FIG. 8 is a vertical sectional view showing a modification of the wire holder shown in FIG. 6.

FIG. 8 shows a modification of the wire holder shown in FIGS. 6 and 7. A wire holder of the modification likewise generally includes a ball-type wire grip 10 and a connector 12. The ball-type wire grip 10 is constructed in substantially the same manner as that of the embodiment shown in FIGS. 6 and 7 except that a member like the above-described outer casing 62 is eliminated. More particularly, the ball-type wire grip 10 includes a casing 14 formed into a hollow cylindrical shape and open at both ends thereof and a hollow cylindrical sleeve 16 open at both ends thereof so as to permit a wire 18 to be inserted therethrough and received in the casing 14. The sleeve 16 is formed at a substantially central portion thereof with a tapered region of a frustconical shape in section of which an outer surface is tapered toward a distal end thereof. The tapered region is formed with a through-hole 20 extending in a direction perpendicular to an axial direction of the sleeve 16, in which balls 22 are received in a manner to be opposite to each other, resulting in restriction and release of the wire being selectively carried out. For this purpose, the casing 14 is formed on an inner surface thereof with a tapered region 24 which is tapered toward a distal end thereof in a manner to correspond in position and shape to the tapered region of the sleeve 16. The casing 14 is provided at a proximal end thereof with threads 26. In the illustrated embodiment, the threads 26 are female or internal. Also, in the casing 14 is arranged a spring 28 in the form of a coiled spring for resiliently forcing the tapered region of the sleeve 16 in a direction of the distal end of the sleeve 16, so that the balls 22 are normally pressed against the tapered region 24 of the casing 14.

The connector 12 includes a connector body 66 which is formed into a pillar-like or cylindrical shape and provided at a distal end portion thereof with threads 30, through which the connector body 62 is threadedly inserted at the distal end thereof into the threaded proximal end 26 of the casing 14. The connector body 66 is formed on an outer surface thereof with a groove 34 communicating with the sleeve 16 of the wire grip 10 and longitudinally extending from the distal end portion thereof to an intermediate portion thereof in such a manner that a bottom surface of the groove 34 is curved so as to decrease a depth of the groove toward a proximal end portion of the connector body 66 and toward the outer surface of the connector body. The groove 34 may be formed so as to laterally extend from a central axis of the connector body 66 to the outer surface of the connector body. More particularly, in the illustrated embodiment, the groove 34 is formed so as to longitudinally extend from the distal end portion of the connector body 66 to the intermediate portion of the connector body 66 and laterally extending from the central axis of the connector body 66 to the outer surface of the connector body in such a manner that the bottom surface of the groove 34 is smoothly curved so as to gradually decrease the depth of the groove toward the proximal end portion of the connector body 66 and toward the outer surface of the connector body.

Also, the connector 12 includes a threaded connecting member 68 which is mounted on the connector body 66 so as to be pivotally movable and rollable with respect to the connector body. The threaded connecting member 68 comprises a joint section 70 which includes a hemispherical rolling element 72 and a threaded rod element 74 extending from the rolling element 72 and a threaded holding section 76 which is formed into a substantially hollow cylindrical shape and at both distal and proximal ends thereof with threads 78 and 80, respectively. The rod element 74 of the joint section 70 is threadedly inserted through a sleeve element 82 into the threads 80 formed at the proximal end of the holding section 76. To the threads 78 at the distal end of the holding section 76 is threadedly connected a supported or set-up article (not shown).

Correspondingly, the connector body 66 is provided at the proximal end portion thereof with a joint receiving section 90 for rollably receiving the hemispherical rolling element 74. In the illustrated embodiment, the joint receiving section 90 comprises a hollow member of a substantially cylindrical shape open at a distal end thereof and closed at a proximal end thereof. The cylindrical member 90 is formed in distal end thereof with threads 92 which is threadedly fitted on threads 94 formed on the proximal end of the connector body 66 to connect the joint receiving section or cylindrical member 90 to the connector body 66. The joint receiving section 90 is formed at the proximal end thereof with a guide cutout 86, which is arranged so as to permit the rod element 74 of the joint section 70 to outward extend therethrough and be pivotally movable within an angular range of about 90 degrees depending upon the rolling of the rolling element 72 in the joint receiving section 90.

The remaining part of the illustrated embodiment may be constructed in substantially the same manner as the above-described embodiment.

Thus, it will be readily noted that the modification of FIG. 8 exhibits substantially the same function as the embodiment shown in FIGS. 6 and 7.

The embodiment shown in FIGS. 6 to 8 is so constructed that the connector is provided at the proximal end thereof with the threaded connecting member 68 in a manner to be rollable and pivotally movable over an angular range of about 90 degrees and is formed on the outer surface thereof with the groove longitudinally extending from the upper end portion thereof to the intermediate portion thereof and laterally extending from the central axis of the connector to the outer surface of the connector in the manner that the bottom surface of the groove is smoothly curved so as to gradually decrease a depth of the groove toward the lower end portion of the connector and toward the outer surface of the connector. Such construction of the illustrated embodiment permits the wire to be led out to the exterior of the connector while being deflected from the central axis of the connector along the curved groove during the operation of stretching a wire. Thus, the wire holder facilitates the wire stretching operation and the operation of adjusting the length and tension of a wire.

Figure 9:
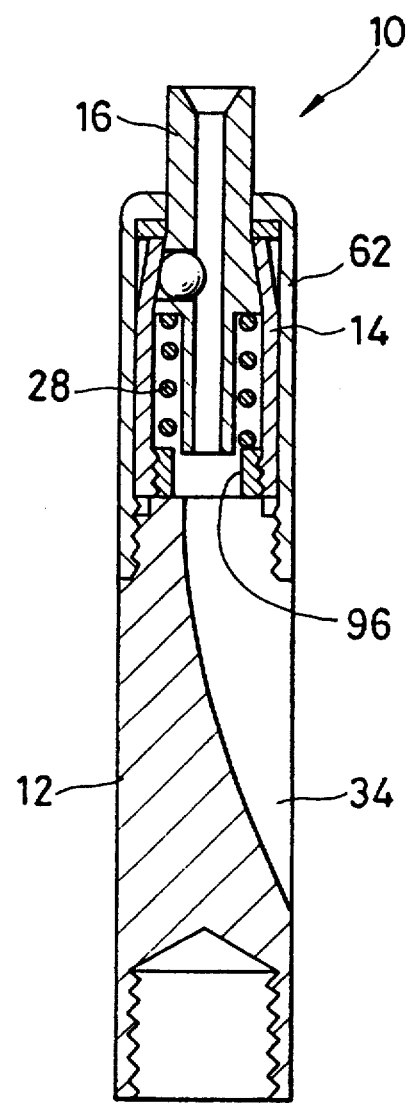
FIG. 9 is a vertical sectional view showing a further embodiment of a wire holder according to the present invention.

FIG. 9 shows a further embodiment of a wire holder according to the present invention. A wire holder of the illustrated embodiment includes a wire grip 10 which is constructed in such a manner that a sleeve 16 and an inner casing 14 are received in an outer casing 62, a spring support nut 96 is arranged in the inner casing 14 so as to hold a spring 28 between the nut 96 and the sleeve 16, and the inner casing 14 is interposedly arranged between a distal end of the outer casing 62 and a connector 12 in a longitudinal direction thereof. The remaining part of the wire holder may be constructed in substantially the same manner as in the embodiment shown in FIGS. 6 and 7 and the connector 12 may be formed with a groove 34 as in the above-described embodiments.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A wire holder comprising:
    a wire grip;
    a connector having an upper end portion, a lower end portion, and a substantially solid intermediate portion, the intermediate portion having a central portion extending axially along said connector, said connector being connected at said upper end portion thereof to said wire grip; and
    means on the connector for attachment to other objects at said lower end portion, said wire grip including a sleeve formed into a hollow cylindrical shape so as to permit a wire to be inserted therethrough, a ball means mounted for selectively restricting the wire, a casing arranged for receiving said sleeve and ball means and formed therein with a tapered region, and a spring for forcing said sleeve to press said ball means against said tapered region of said casing;
    said connector being formed on an outer surface thereof with a groove longitudinally extending from said upper end portion thereof to said solid intermediate portion thereof and laterally extending from a substantially central portion of said connector to said outer surface of said connector in such a manner that a bottom surface of said groove is curved so as to decrease a depth of said groove toward said lower end portion of said connector and toward said outer surface of said connector, said groove extending from said intermediate portion to said sleeve.

2. A wire holder as defined in claim 1, wherein said outer surface of said connector has a multifaceted planar surface.

3. A wire holder as defined in claim 2, wherein said connector is provided at both end portions thereof with threads and threadedly connected to said wire grip.

4. A wire holder as defined in claim 3, wherein said threads provided at said one end portion of said connector through which said connector is connected to said wire grip comprise male threads.

5. A wire holder as defined in claim 4, wherein said threads provided at said other end portion of said connector comprise female threads.

6. A wire holder as defined in claim 3, wherein said threads provided at said other end portion of said connector comprise male threads.

7. A wire holder as defined in claim 3, wherein said connector is provided at said other end portion thereof with a threaded connecting member in a manner to be pivotally movable over an angular range of about 90 degrees, said supported article being connected through said threaded connecting member to said connector.

8. A wire holder as defined in claim 7, wherein said threaded connecting member is arranged so as to be rollable with respect to said connector.

9. A wire holder as defined in claim 7, wherein said connector comprises a connector body connected to said wire grip and a support section connected to said connector body for movably supporting said threaded connecting member.

10. A wire holder as defined in claim 8, wherein said connector comprises a connector body connected to said wire grip and a support section connected to said connector body for movably supporting said threaded connecting member.

11. A combination wire holder and supported article comprising:
    an article to be supported;
    a wire for supporting said article;
    a wire grip; and
    a connector having an upper end portion, a lower end portion, and a substantially solid intermediate portion, the intermediate portion having a central portion extending axially along said connector, said connector being connected at an upper end portion thereof to said wire grip and at a lower end thereof to a suspended article;
    said wire grip including a sleeve formed into a hollow cylindrical shape so as to permit said wire to extend therethrough, a ball means mounted for selectively restricting said wire, a casing arranged for receiving said sleeve and ball means and formed therein with a tapered region, and a spring for forcing said sleeve to press said ball means against said tapered region of said casing;

said connector being formed on an outer surface thereof with a groove longitudinally extending from said upper end portion thereof through said solid intermediate portion thereof and laterally extending from a substantially central portion of said connector to said outer surface of said connector in such a manner that a bottom surface of said groove is curved so as to decrease a depth of said groove toward said lower end portion of said connector and toward said outer surface of said connector, and side walls of said groove extend from the curved bottom surface to said outer surface;

said connector being provided at said other end thereof with a threaded connecting member having a pivot rod member pivotally movable over an angular range of about 90 degrees and a holding member rotatable about the pivot rod member;

said supported article being held through said threaded connecting member to said connector.

12. An improved wire holder assembly to facilitate the hanging of lighting fixtures, comprising:

means for gripping a wire member including a sleeve member having an aperture for passing the wire member, an inner casing member that is slidably positioned about the sleeve member, a series of ball members that are positioned in the sleeve member, the sleeve member having openings to enable the casing member to cam the ball members into gripping contact with the wire member;

a connector body having a pivotable rod element that can be attached to a lighting fixture at one end of the connector body and a threaded circular surface at the other end of the connector body, the connector body being substantially solid and having a central groove of a curved configuration extending substantially along a length of the connector body and of a dimension to receive and bend the wire member and a joint receiving recess for attachment to the pivotable rod element, the central groove being connected with the joint receiving recess; and an outer hollow casing member of a cylindrical shape having a restricted opening at one end to encompass the inner casing member and internal threads at the other end to engage the threaded circular surface of the connector body.

13. The wire holder assembly of claim 12, further including first resilient means extending between the inner casing member and the sleeve member.

14. The wire holder assembly of claim 13, further including second resilient means extending between the outer casing member and the inner casing member in the form of an elastic ring member.

* * * * *